United States Patent [19]

Juhasz

[11] 4,029,042

[45] June 14, 1977

[54] DIFFERENTIAL PRESSURE INDICATOR DEVICE

[75] Inventor: Charles Juhasz, Caldwell, N.J.

[73] Assignee: Aircraft Systems Corporation, West Caldwell, N.J.

[22] Filed: Feb. 17, 1976

[21] Appl. No.: 658,369

[52] U.S. Cl. .................. 116/114 PV; 116/DIG. 42
[51] Int. Cl.² ........................................ G01D 13/00
[58] Field of Search ... 116/114 K, 114 AD, DIG. 42, 116/DIG. 25, 114 PV

[56] References Cited

UNITED STATES PATENTS

| | | | |
|---|---|---|---|
| 3,154,049 | 10/1964 | Smith et al. | 116/DIG. 42 |
| 3,187,711 | 6/1965 | Campolong | 116/DIG. 42 |

Primary Examiner—Jerry W. Myracle
Attorney, Agent, or Firm—Bernard Malina

[57] ABSTRACT

A differential pressure indicator includes an indicator element having a magnet affixed to the lower end thereof, the element being axially movable from a retracted non-indicating position to an extended indicating position. A spring-biased piston made of material which is not a permanent magnet but which is responsive to a magnetic field is axially movable in a fluid pressure chamber in response to changes in differential pressure. An increase in differential pressure causes the indicator element to move upwardly to a visual indicating position where its tip protrudes beyond the casing of the device.

8 Claims, 4 Drawing Figures

DIFFERENTIAL PRESSURE INDICATOR DEVICE

BACKGROUND OF THE INVENTION

The present invention relates to fluid pressure indicating devices and more particularly to a device for detecting and indicating pressure differential between two pressure areas.

By way of example only, the present invention finds particular application in hydraulic systems, where filters are provided to screen out dirt or foreign matter from the hydraulic fluid such as oil passing through the filter. In the course of operation of the hydraulic system, foreign matter accumulates on the filter and the differential oil pressure between the upstream and downstream sides increases, i.e. the upstream side of the filter becomes a high pressure area in relation to the downstream side which becomes a low pressure area. Thus, the magnitude of the pressure differential between the respective areas on either side of the filter represents the extent to which such filter clogging impedes the flow of oil therethrough and thus indicates the operative condition of the filter. Unless such hydraulic filters are timely replaced, i.e. when unduly clogged, the efficiency of the hydraulic system is degraded and continued failure of filter replacement may cause serious impairment of the hydraulic system. It is, therefore, essential that a clear and reliable warning signal be given to the operator when the filter screen becomes unduly clogged so that he may timely replace the clogged filter with a clean one.

In certain applications, such as hydraulic indicator systems in aircraft equipment, it is necessary that such differential pressure indication be visual and independent of the electrical system, giving an unambiguous positive visual indication when in an indicating condition and non-visible when in the non-indicating condition.

It is therefore, an object of the present invention to provide a differential fluid pressure indicator of the character described which is operative independently of an external power source particularly electrical power.

It is another object of the present invention to provide a differential fluid pressure indicator of the character described which provides a discrete visual indication when detecting a differential pressure greater than a preselected level.

It is yet a further object of the present invention to provide a differential fluid pressure indicator of the character described which is provided with means for preventing a false high differential pressure indication which would otherwise be caused by low temperature of the hydraulic fluid.

SUMMARY OF THE INVENTION

In accordance with the principles of the present invention there is provided a differential pressure indicator device for use with high and low fluid pressure sources comprising a casing having a relatively thin partition wall dividing the casing interior into an indicator housing and a fluid chamber. There is a further provided sealing means axially movable in the fluid chamber dividing the fluid chamber into a first chamber adaptable for connection to the high fluid pressure source and a second chamber adaptable for connection to the low fluid pressure source. An indicator element is provided in the indicator housing and is axially movable therein, the indicator element having a first permanent magnet secured thereto and a second permanent magnet in the indicator housing spaced apart from the partition wall.

Further objects, features and advantages of this invention will become apparent from a consideration of the following description, the appended claims and the accompanying drawings in which:

BREIF DESCRIPTION OF THE DRAWINGS

DETAILED DESCRIPTION OF THE INVENTION

Figure 1:
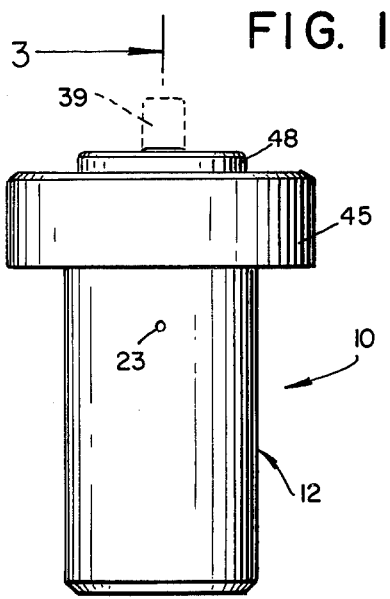
FIG. 1 is an elevation view of a differential pressure indicator in accordance with the principles of the present invention in one embodiment thereof.
Figure 2:
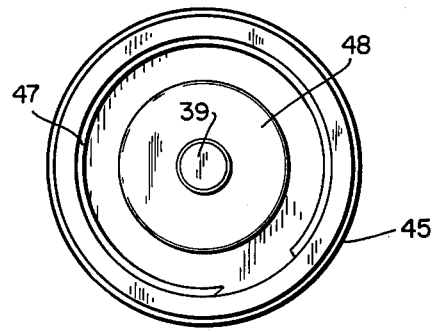
FIG. 2 is a top plan view of the differential pressure indicator of FIG. 1.
Figure 3:
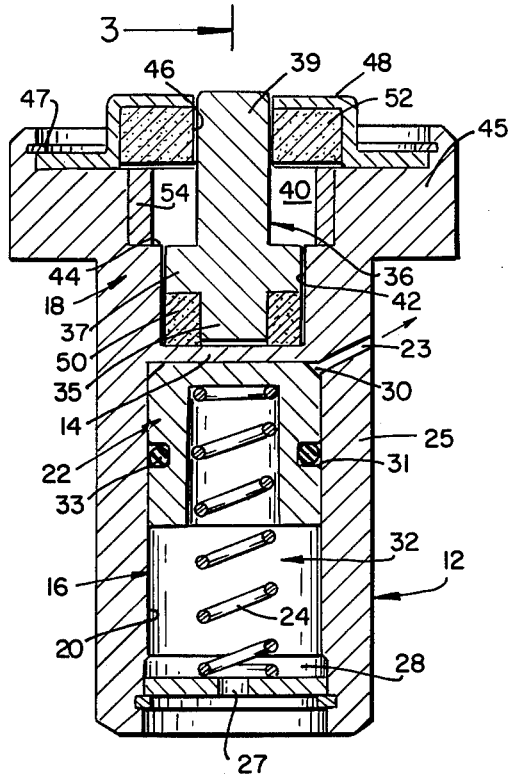
FIG. 3 is a sectional view taken along the line 3—3 of FIG. 1 showing the differential pressure indicator in the non-indicating condition.
Figure 4:
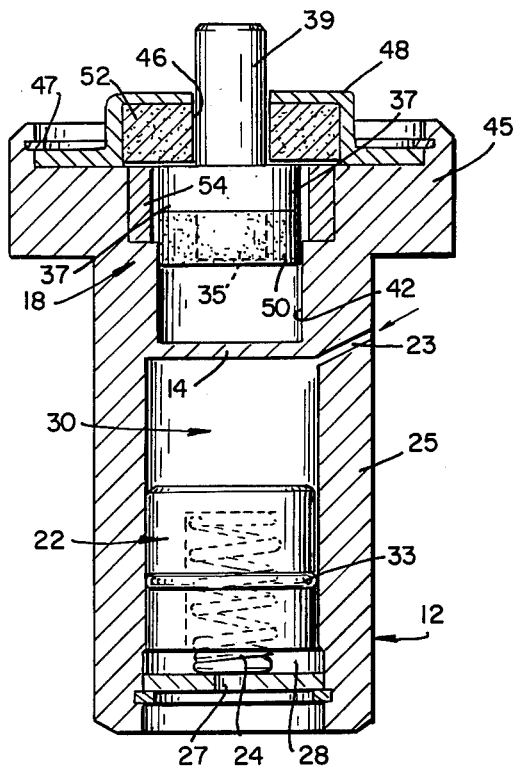
FIG. 4 is a view similar to that of FIG. 3 in partial section, showing the differential pressure indicator in the indicating condition.

Referring to the drawings, and in particular to FIGS. 1, 3 and 4 thereof, a differential pressure indicator constructed in accordance with the principles of the present invention is designated by the numeral 10. Indicator 10 comprises a generally cylindrical casing 12 made of non-magnetic material such as aluminum, for example, and has an internal horizontal partition membrane wall 14 which divides the interior of casing 12 into a pressure sensing chamber 16 and an upper indicator housing 18.

Cylindrical casing 12 comprises a cylindrical bore 20 forming fluid pressure chamber 16. A sealing member 22 in the form of cup-shaped piston of ferrous material, open at the bottom, is slidably received in bore 20 for close-fitting axial movement therein. Fluid pressure chamber 16 is provided with a high pressure fluid inlet port 23 located in the upper portion of cylinder sidewall 25 and a low pressure inlet port 27 centrally formed in base wall 28 with ports 23 and 27 leading to high and low pressure areas in a fluid pressure system (not shown). A compression spring 24 is slidably received within the cylindrical interior of piston 22 bearing at its upper end against the underside of piston top wall 26 and at its lower end against base wall 28. Spring 24 thus biases piston 22 upwardly to the position shown in FIG. 3, whereby piston top wall 26 is just below high pressure inlet port 23.

Piston top wall 26 serves to partition chamber 16 into a high pressure chamber 30 extending from the underside of membrane wall 14 to the top surface of piston top wall 26 and a low pressure chamber 32 extending from the underside of piston top wall 26 to base wall 28, i.e. the balance of bore 20. Axial movement of piston 22 in response to changes in differential pressure between high and low pressure chambers 30 and 32 respectively, as hereinafter described, produced corresponding enlargement and diminution of chambers 30 and 32 respectively. A ring seal 33 positioned in lateral annular recess 31 in the sidewall of piston 32 provides an effective fluid-tight seal between high and low pressure chambers 30 and 32.

When the fluid pressure in upper chamber 30 is less than or equal to the fluid pressure in lower chamber 32, i.e. the differential pressure is zero or negative, bias spring 24 urges piston 22 to its upward limit position shown in FIG. 3, whereby piston top wall 26 is immediately adjacent to membrane wall 14.

As the fluid pressure in upper chamber 30 increases beyond the pressure level in lower chamber 32, the increased pressure in chamber 30 acting downwardly on piston 22 counteracts the net upward pressure thereon representing the sum of the fluid pressure in lower chamber 32 and the upward pressure exerted by bias spring 24, causing piston 22 to depress spring 24 and move downwardly in accordance with the magnitude of the net downward pressure. When the differential pressure exceeds the upward bias spring pressure, piston 22 is urged downwardly toward base wall 28 as shown in FIG. 4.

An indicator member 34 in the form of a cylindrical element 36 is slidably received for axial movement within cylindrical cavity 40 of indicator housing 18. Indicator cavity 40 comprises a lower cylindrical bore 42 and an upper shouldered portion 44. The upper end of casing 12 extends into an annular flange 45 which is provided with a circular recess 47 in the top wall thereof. A cup-shaped cap 48 which seats in recess 47 to close the top of casing 12 is provided with a central circular aperture 46 for slidably receiving indicator element 36 as hereinafter described.

Indicator element 36, comprises a lower stem portion 35 having a concentric ring magnet 50 fixedly fitted thereover, an intermediate radial shoulder 37 slidably received in bore 42 and an upper pin portion 39 extending through aperture 46. A cylindrical ring magnet 52 surrounding indicator pin 39 is fixedly seated in the underside hollow of cap 48.

Referring to FIG. 3, magnet 50 creates a magnetic field which extends through membrane wall 14 whereby piston 22, which is made of ferrous material, exerts a strong downward force on axially movable indicator element 36. At the same time, fixed ring magnet 52 creates another magnetic field which extends downwardly to ring magnet 50 exerting an attractive, i.e. upward, force thereon and hence on indicator element 36.

The magnitude of the attractive force between magnet 50 and piston 22 varies inversely as the square of the distance therebetween. Under conditions of low differential pressure, i.e. when the pressure in high pressure chamber 30 is insufficient to overcome the sum of the upward forces acting on piston 22, comprising the bias force of spring 24 and attractive force of magnet 50, piston 22 will lie in its upward limit position shown in FIG. 3. In addition, under these conditions, indicator element 36 will remain in its lower position with indicator pin 39 in its retracted position withdrawn in aperture 46, i.e. in the non-indicating position.

As the pressure in high pressure chamber 30 increases relative to that in low pressure chamber 32, there will be an increase in the net downward force on piston 2 causing the latter to move away from membrane wall 14 and ring magnet 50. The resultant reduction in attractive force between piston 22 and ring magnet 50 due to this increased separation, relaxes ring magnet 50 from the retentive influence of piston 22, leaving ring magnet 50 susceptible to the upwardly attractive force of fixed ring magnet 52 and free to move upwardly in response thereto. Accordingly, when the differential pressure exceeds a predetermined critical value, indicator element 36 will move to its upward limit position shown in FIG. 4, whereby the tip portion of indicator pin 39, which may be coated in a red color to attract attention, projects beyond casing 12, thus giving indication that the preselected differential pressure level has been exceeded.

It will be understood that the strengths of the magnetic fields produced by magnets 50 and 52, the spacing therebetween, the spacing between magnet 50 and ferrous piston 22 as well as the bias force exerted by spring 24 are among the factors that determine the critical differential pressure which will render indicator 36 into the indicating, i.e. extended position.

In order to prevent unwanted pressure indication due to low temperature, a conventional bimetallic ring element 54 is located in the shoulder recess formed by bore shouldered portion 44 and is operative in the following manner. At normal temperatures bimetallic element 54 has an internal diameter greater than that of indicator shoulder 37 thereby allowing the latter to rise therethrough. However, when the ambient temperature drops below a preselected level, bimetallic element 54 will contract concentrically about indicator pin 39 and extend over indicator shoulder 37 thus blocking upward travel of element 36 and thereby preventing unwanted actuation of differential pressure indicator 10.

Although the invenion has been described with reference to a particular embodiment thereof, it is to be understood that such embodiment is merely illustrative of the application of the principles of the invention. Numerous modifications may be made therein and other arrangements may be devised without departing from the spirit and scope of the invention.

What is claimed is:

1. Differential pressure indicator device for use with high and low fluid pressure sources comprising: a casing having a relatively thin partition wall dividing the casing interior into an indicator housing and fluid chamber, magnetically soft sealing means axially movable in said fluid chamber dividing said fluid chamber into a first chamber adaptable for connection to said high fluid pressure source and a second chamber adaptable for connection to said low fluid pressure source, an indicator element axially movable in said indicator housing having a first permanent magnet secured to said indicator element, and a second permanent magnet in said indicator housing spaced from said partition wall.

2. Differential pressure indicator device as defined in claim 1 wherein said first permanent magnet is fixedly secured to said indicator element at the lower end thereof.

3. Differential pressure indicator device as defined in claim 2 wherein said indicator element is movable from a non-indicating position wherein said first permanent magnet is in close proximity to said partition wall to an indicating position wherein said first permanent magnet is moved away from said partition wall toward said second permanent magnet.

4. Differential pressure indicator device as defined in claim 3 including bias means urging said sealing means in the direction of said partition wall.

5. Differential pressure indicator device as defined in claim 4 wherein fluid pressure from said high pressure source is operative to urge said sealing means apart from said partition wall in a direction opposite to the force exerted by said bias means upon said sealing means.

6. Differential pressure indicator device as defined in claim 5 wherein said sealing means comprises material responsive to the first magnetic field produced by said first permanent magnet whereby said sealing means is subjected to a force attracting the latter to said first magnetic element when said sealing means lies within said first magnetic field.

7. Differential pressure indicator means as defined in claim 6 wherein said second permanent magnet produces a second magnetic field operative to exert an attractive force on said first permanent magnet thereby urging said indicator element away from said partition wall and in the direction of said second permanent magnet.

8. Differential pressure indicator means as defined in claim 7 wherein said indicator housing includes an aperture in the top wall thereof to reveal said indicator element when the latter is rendered into an indicating position.

* * * * *